United States Patent [19]
Aleksandrov et al.

[11] Patent Number: 5,946,428
[45] Date of Patent: Aug. 31, 1999

[54] FIBER OPTIC SYSTEM WITH SIMULTANEOUS SWITCHING AND RAMAN

[75] Inventors: Igor Vladimirovitch Aleksandrov; Zinaida Vasylevna Nestrova, both of St. Petersburg, Russian Federation; Daniel Aloysius Nolan, Corning, N.Y.

[73] Assignee: Corning Incorporated, Corning, N.Y.

[21] Appl. No.: 09/000,359

[22] PCT Filed: Jul. 1, 1997

[86] PCT No.: PCT/US97/11699

§ 371 Date: Jan. 29, 1998

§ 102(e) Date: Jan. 29, 1998

[87] PCT Pub. No.: WO98/01777

PCT Pub. Date: Jan. 15, 1998

[30] Foreign Application Priority Data

Jul. 9, 1996 [RU] Russian Federation ............ 96115406

[51] Int. Cl.⁶ ................................ G02B 6/26; H01S 3/00
[52] U.S. Cl. ................................ 385/11; 385/28; 385/29; 372/6; 372/19; 359/341
[58] Field of Search ................................ 385/11, 28, 29, 385/16; 372/19, 6, 75; 359/340, 341

[56] References Cited

U.S. PATENT DOCUMENTS

| | | | |
|---|---|---|---|
| 4,529,943 | 7/1985 | George et al. | 330/4.3 |
| 4,633,524 | 12/1986 | Hasegawa | 455/612 |
| 4,700,339 | 10/1987 | Gordon et al. | 370/3 |
| 4,786,140 | 11/1988 | Melman et al. | 350/96.29 |
| 4,881,790 | 11/1989 | Mollenauer | 359/173 |
| 4,918,751 | 4/1990 | Pessot et al. | 455/608 |
| 5,191,628 | 3/1993 | Byron | 385/27 |
| 5,307,436 | 4/1994 | Berkey | 385/123 |
| 5,530,710 | 6/1996 | Grubb | 372/6 |
| 5,793,905 | 8/1998 | Maier et al. | 385/11 X |
| 5,818,630 | 10/1998 | Fermann et al. | 359/341 |
| 5,867,305 | 2/1999 | Waarts et al. | 359/341 |

OTHER PUBLICATIONS

Islam, Mohammed N. "Ultrafast fiber switching devices and systems", AT&T, Cambridge University Press, pp. 10–18 (No Dates Available).

Halsa, N.J. et al. "Ultrafast light–controlled optical–fiber modulator", Appl. Phys. Lett., vol. 50, No. 14, Apr. 6, 1987, pp. 886–888.

Primary Examiner—Hemang Sanghavi
Attorney, Agent, or Firm—William Greener

[57] ABSTRACT

A fiber optic system in accordance with the present invention includes an optical fiber, a coupling device, and a system for generating a pump signal. The optical fiber has a birefringence which preserves polarization and has a first polarization mode which is substantially perpendicular to a second polarization mode. The coupling device couples an input signal with an input wavelength into the optical fiber so that the input signal propagates in the first polarization mode in the optical fiber. The system for generating a pump signal generates a pump signal with a pump wavelength which is within a range of 50 nanometers (nm) to 300 nm less than the input wavelength and which has a first amount of pump power which is enough power to switch the input signal, but not enough to create higher order solitons. The coupling device also couples the pump signal into the optical fiber so that the pump signal propagates in the first polarization mode in the optical fiber. The pump signal induces a nonlinear birefringence in the optical fiber which causes the input signal to switch polarization modes and propagate in the second polarization mode, and amplifies the input signal propagating through the optical fiber. Accordingly, with the fiber optic system an input signal can be amplified and switched concurrently, and thus separate stages for amplification and switching are not required.

9 Claims, 1 Drawing Sheet

FIBER OPTIC SYSTEM WITH SIMULTANEOUS SWITCHING AND RAMAN

FIELD OF THE INVENTION

This invention relates generally to a fiber optic system and more particularly, to a fiber optic system which can concurrently amplify and switch an input signal via a pump signal.

BACKGROUND OF THE INVENTION

Historically, fiber optic systems have separately addressed the problems of switching of an input signal and amplifying the input signal.

For example, one type of optical switch for an input signal uses a birefringent fiber switch which has an optical fiber with a birefringence that preserves polarization. When an input signal is coupled into the birefringent optical fiber, the input signal propagates in one of two, perpendicular, polarized modes in the optical fiber. To switch the input signal to propagate in the other polarized mode in the birefringent optical fiber, a gating signal of sufficient energy is coupled into the optical fiber to propagate in the same polarized mode as the input signal initially. The gating signal induces a non-linear birefringence in the optical fiber which causes the input signal to switch and propagate in the other polarized mode. However, the gating signal in the birefringent fiber switch does not amplify the input signal.

One example of a type of optical amplifier for amplifying an input signal uses an optical fiber and a phenomenon known as Raman gain. Again, the input signal propagates in the optical fiber. To amplify the input signal using Raman gain, a pump signal whose wavelength is less than the wavelength of the input signal is coupled into the optical fiber which is carrying the input signal. The pump signal amplifies the input signal, but does not switch the polarization or propagation of the input signal.

SUMMARY OF THE INVENTION

A fiber optic system in accordance with the present invention includes an optical fiber, a coupling device, and a system for generating a pump signal. The optical fiber has a birefringence which preserves polarization and has a first polarization mode which is substantially perpendicular to a second polarization mode. The coupling device couples an input signal having an input wavelength into the optical fiber so that the input signal propagates in the first polarization mode in the optical fiber. The system for generating a pump signal generates a pump signal with a pump wavelength which is within a range of 50 nm to 300 nm less than the input wavelength and which and has a first amount of pump power which is enough power to switch the input signal polarization, but not enough power to create higher order solitons. The coupling device also couples the pump signal into the optical fiber so that the pump signal propagates in the first polarization mode in the optical fiber. The pump signal alters the birefringence of the optical fiber which causes the input signal to switch polarization modes and propagate in the second polarization mode and amplifies the input signal as it propagates through the optical fiber. Accordingly, with the fiber optic system of the invention, an input signal can be amplified and switched concurrently, and thus separate stages for amplification and switching are not required.

DETAILED DESCRIPTION OF THE INVENTION

Figure 1:
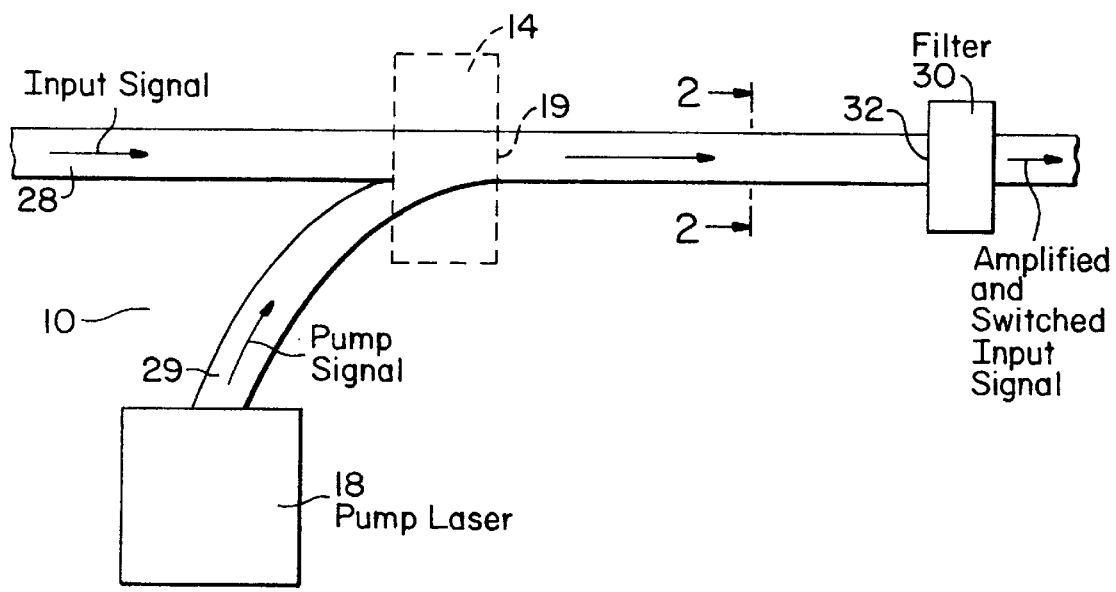
FIG. 1 is a block diagram of a fiber optic system in accordance with the present invention.

One embodiment of a fiber optic system 10 in accordance with the present invention is illustrated in FIG. 1. Fiber optic system includes an optical fiber 12, a coupler 14, and a pump laser 18. With fiber optic system 10, an input signal can be both amplified and switched concurrently, and thus separate stages for amplification and switching are not required.

Referring more specifically to FIG. 1, fiber optic system 10 includes optical fiber 12 which has a birefringence that preserves polarization. Since optical fiber 12 is birefringent, optical fiber 12 has a first polarization mode which is substantially perpendicular to a second polarization mode. An input signal coupled into one end 19 of optical fiber 12 will propagate in either the first or second polarization mode.

Figure 2:
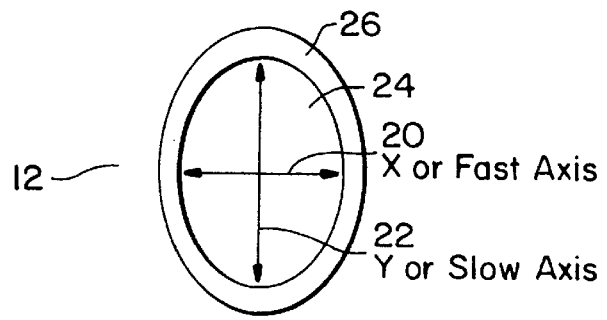
FIG. 2 is a cross-sectional view of the optical fiber taken along lines 2—2 of FIG. 1.

Referring to FIG. 2, optical fiber 12 has an elliptical, cross sectional shape with a short or fast axis 20, along which one of the polarization modes runs, and a long or slow axis 22, along which the other one of the polarization modes runs. Although an optical fiber 12 with an elliptical shape is shown, other types of birefringent optical fibers, such as an optical fiber with stress rods, could be used. Optical fiber 12 has a core 24, which in this particular embodiment is made from silica, and a cladding 26.

Fiber optic system 10 also includes a pump laser 18 which generates a pump signal which has a pump wavelength that is about 50 nm to 300 nm less than the input wavelength for the input signal. The pump wavelength and gain are chosen to amplify the signal, but not to the point of creating higher order solitons. The pump signal is also generated by laser pump 18 to have sufficient energy to induce a non-linear birefringence in optical fiber 12 and cause the input signal to switch between the two polarization modes. The amount of energy or power needed to induce a non-linear birefringence in optical fiber 12 and cause the input signal to switch polarization modes depends upon the birefringence of optical fiber. Pump laser 18 outputs the pump signal on optical fiber 29. Although in this particular embodiment a pump laser 18 is used, any type of system for generating the pump signal could be used.

Fiber optic system 10 also includes coupler 14 which couples the input signal and the pump signal into the optical fiber 12 to propagate in the first polarization mode. Coupler 14 is located between an optical fiber 28 and one end 19 of optical fiber 12 and couples the input signal and pump signal into optical fiber 12. In a preferred embodiment, coupler 14 is a wavelength division multiplexer (WDM). Although only one coupler 14 is shown, separate couplers could be used to input the input signal and pump signal.

Fiber optic system 10 may also include a filter 30 which can be coupled to the other end 32 of optical fiber 12. Filter 30 removes unwanted wavelengths after the input signal has been amplified and switched, including any of the pump signal which remains.

Fiber optic system 10 operates by coupling input and pump signals into optical fiber 12 via coupler 14. In this particular embodiment, a soliton signal is used as the input signal and as the pump signal, although other types of input and pump signals could be used. The input signal and the pump signal propagate in a first polarization mode with their electric fields aligned. In this particular example, input signal and pump signal are input to propagate in the short or fast axis 20.

When the pump signal is coupled into optical fiber 12 as described above, part of the energy of the pump signal converts to and combines with the input signal to amplify the input signal. Effectively, the pump signal converts its energy to the input signal wavelength. The amplification of the input signal is the result of a phenomenon called Raman gain. For Raman gain to occur in optical fiber 12, there needs to be a difference between the wavelength of the input signal and the wavelength of the pump signal from pump laser 18. Preferably in systems using soliton signals, the difference between the two wavelengths should be such that the gain occurs without the creation of higher order solitons. Accordingly, in this particular embodiment the gain is on the order of ten to avoid creating higher order solitons. To keep the amplification factors on the order of ten, the wavelength of the pump signal is kept within a range of 50 nm to 300 nm less than the wavelength of the input signal when the wavelength of the input signal is near 1550 nm.

The specific amount of amplification or Raman gain experienced by the input signal in optical fiber 12 is determined by the following equation:

$$P = P_0 e^{[g \, P_2 L/A]}$$

where P represents the power of the input signal after amplification, $P_0$ is the power of the input signal before amplification, $P_2$ is the power of the pump signal, A is the effective area of optical fiber, g is the gain coefficient which is a function of the difference between the pump wavelength and the input wavelength, and L is the length of the optical fiber.

By way of example, for an optical fiber with an effective area of 50 $\mu m^2$ and a length of 10 meters which receives a one kilowatt input signal and a one kilowatt pump signal from pump laser 18 and where the input and pump wavelengths are separated by 100 nm and the gain coefficient is $1 \times 10^{-11}$ cm/watt, the gain of the input signal will be approximately $e^{20}$. If the wavelength of the pump signal is 300 nm from the wavelength of the input signal, then the amplification factor will be $e^2$, or a gain of about seven.

While the input signal is being amplified in optical fiber 12 as described above, the input signal is also being switched in optical fiber 12. The pump signal from pump laser 18 coupled into and propagating in the first polarization mode of optical fiber 12 has sufficient energy to induce a non-linear birefringence in optical fiber 12 and thus cause the input signal to switch from propagating in the first polarization mode to propagating in the second polarization mode.

As discussed above, the amount of energy or power required to switch the input signal in optical fiber 12 depends upon the birefringence of optical fiber 12, as discussed in M.N. Islam, Ultrafast Fiber Switching Devices and Systems, Cambridge, University Press, 1992, which is herein incorporated by reference. The birefringence of the optical fiber 12 can be determined by the equation:

$$\Delta N = 0.33 N_2 (I_x - I_y)$$

where $N_2$ is the index of refraction of the core of optical fiber 12, $I_x$ is the intensity of the input signal along the x-axis, and $I_y$ is the intensity of the input signal along the y-axis. Once the birefringence ($\Delta N$) is known, then the amount of power or energy required to switch the input signal in optical fiber 12 can be determined by first substituting for $I_x$ with the following equation:

$$I_x = P_x / A_x$$

where $P_x$ is the power of the pump signal and $A_x$ is the effective area of optical fiber 12 and then by solving for $P_x$. By way of example, when the core 24 of optical fiber 12 is glass, then $N_2 = 3.2 \times 10^{-16}$ P/A and assuming $I_x$ is 10 W/$\mu$m, and $I_y$ is 0, $\Delta N$ is on the order of $10^{-6}$, and $A_x$ is 50 $\mu m^2$, then $P_x$ equals a one kilowatt pump signal.

Once the amplified and switched input signal reaches the other end 32 of optical fiber 12, filter 30 removes any of pump signal which still remains. Filter 30 is designed to only permit certain wavelengths of light signals to pass through. If the undesired wavelengths are not removed, the undesired wavelengths will broaden the input signal as the input signal propagates since the dispersion can be significantly different for the two wavelengths. Accordingly, with the present invention an input signal may concurrently be amplified and switched by a pump signal.

Having just described the basic concept of the invention, it will be readily apparent to those skilled in the art that the forgoing detailed disclosure is intended to be presented by way of example only, and is not limiting. Various alterations, improvements and modifications will occur and are intended to those skilled in the art, though not expressly stated herein. These modifications, alterations, and improvements are intended to be suggested hereby, and are within the spirit and scope of the invention, Accordingly, the invention is limited only by the following claims and equivalents thereto.

What is claimed is:

1. A fiber optic system comprising:

an optical fiber having a polarization mode-preserving value of birefringence, the optical fiber having a first polarization mode which is substantially perpendicular to a second polarization mode;

a coupler for coupling an input signal having an input wavelength into the optical fiber to propagate in the first polarization mode; and a system for generating a pump signal with a pump wavelength which is within a range of 50 nm to 300 nm less than the input signal wavelength and which has a first power, the coupler also coupling the pump signal into the optical fiber to propagate in the first polarization mode, wherein the pump signal amplifies the input signal as the input signal propagates through the optical fiber, and further wherein the first power is sufficient to induce a non-linear birefringence in the optical fiber such that the input signal first polarization mode is converted to the second polarization mode for propagating through the fiber.

2. A fiber optic system as set forth in claim 1 wherein the pump wavelength is about 150 nm less than the input signal wavelength.

3. The fiber optic system as set forth in claim 1 further comprising a filter coupled to the other end of the optical fiber.

4. The fiber optic system set forth in claim 1 wherein the system for generating a pump signal is a pump laser.

5. The fiber optic system as set forth in claim 1 wherein the input signal is a soliton signal and the pump signal is a soliton signal.

6. The fiber optic system set forth in claim 1 wherein the coupler is a WDM coupler.

7. A system for concurrently switching the polarization modes of, and amplifying, an input optical signal, the system comprising:

an optical fiber with a birefringence value which preserves polarization, the optical fiber having a first polarization mode which is substantially perpendicular to a second polarization mode;

a coupler for coupling an input optical signal having an input wavelength into the optical fiber, the input optical signal propagating in the first polarization mode; and a system for generating a pump signal with a pump wavelength which is about 150 nm less than the input wavelength and which has a first power, the coupler coupling the pump signal into the optical fiber to propagate in the first polarization mode, the pump signal altering the birefringence of the optical fiber which causes the input optical signal to switch polarization modes and propagate in the second polarization mode and amplifying the input optical signal as the input optical signal propagates through the optical fiber; and a filter coupled to the other end of the optical fiber.

8. The fiber optic system set forth in claim 7 wherein the system for generating the pump signal is a pump laser.

9. The fiber optic system as set forth in claim 7 wherein the input signal is a soliton signal and the pump signal is a soliton signal.

* * * * *